United States Patent
Baud

[15] 3,665,634
[45] May 30, 1972

[54] FISH PLUG LURE

[72] Inventor: Roger C. Baud, Redwood City, Calif.

[73] Assignee: Finizen Lures, Inc., Carson City, Nev.

[22] Filed: May 1, 1970

[21] Appl. No.: 33,697

[52] U.S. Cl. ................................43/35, 43/37, 43/42.36, 43/42.41, 43/42.44
[51] Int. Cl. ..............................................A01k 83/02
[58] Field of Search...............43/35, 37, 42.1, 42.36, 42.41, 43/42.44

[56] References Cited

UNITED STATES PATENTS

| | | | |
|---|---|---|---|
| 1,571,770 | 2/1926 | Fenner | 43/37 X |
| 969,014 | 8/1910 | Walters | 43/35 |
| 635,547 | 10/1899 | Howard | 43/35 |
| 806,898 | 12/1905 | Kepler | 43/35 |
| 1,812,906 | 7/1931 | Swearingen | 43/35 |
| 1,694,697 | 12/1928 | Beidatsch | 43/37 X |

Primary Examiner—Aldrich F. Medbery
Assistant Examiner—G. M. Yahwak
Attorney—Allan M. Shapiro

[57] ABSTRACT

Fish lure having a body within which is pivoted a hook which can move from a fully-retracted position to an extended position. The leader extending from the fish tackle to the lure is secured to the hook in such a position that the hook is stressed by leader tension toward the extended position. Trigger means, actuatable by the fish, retains the hook in the retracted position until actuated. A resilient member urges the trigger means into the hook retention position. The body of the fish lure resembles fish bait and the trigger means resembles a natural fin thereon.

13 Claims, 5 Drawing Figures

Patented May 30, 1972
3,665,634
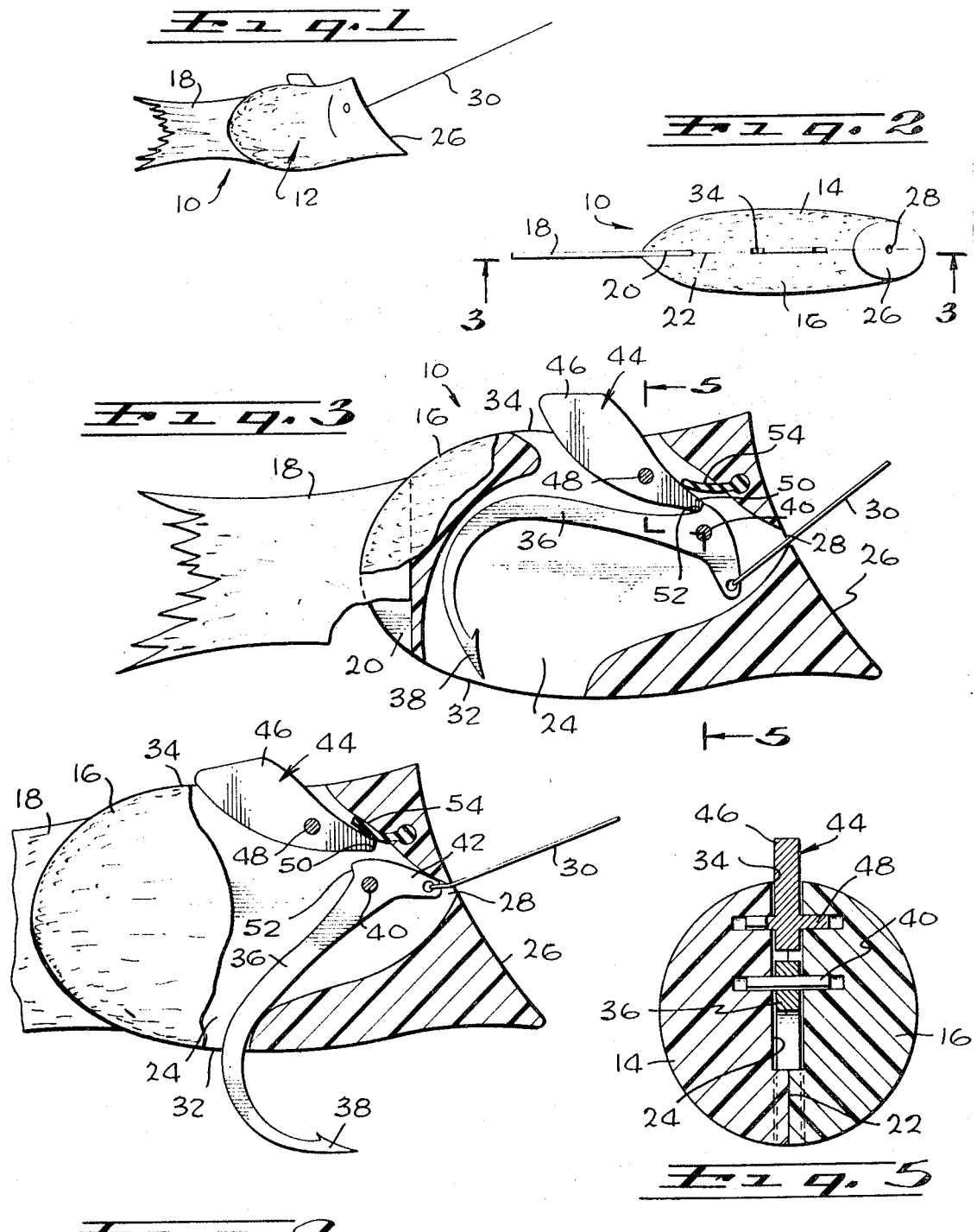
INVENTOR.
ROGER C. BAUD
BY Allan M. Shapiro
ATTORNEY though 3,665,634

FISH PLUG LURE

CROSS REFERENCE

The applicant relies upon the benefit of the filing date of patent application Ser. No. 22,232, filed Mar. 24, 1970, entitled "Fish Lure," as to common subject matter.

BACKGROUND OF THE INVENTION

1. Field of the Invention

This invention is directed to a fish lure and, particularly, to a lure which has a retracted hook which is released and extended when a fish engages upon the lure.

2. Description of the Prior Art

There have been many attempts in the past to provide fish lures of the artificial bait or plug types having improved ability to catch fish when trolled or retrieved at the end of a line. The majority of such lures resemble or at least simulate smaller fish which serve as a food source for the larger carnivorous fish intended to be caught, and most of such lures are provided with external hooks in single, treble or gang configurations for engaging the fish when the latter strikes or swallows the lure, even partially. However, such normally exterior hooks present numerous problems including weed and kelp entanglement and, even more importantly, interference with the open-mouthed envelopment of the lure or at least the major portion thereof by the fish. In order to solve the exterior hook problem, there have been numerous attempts to provide lures with hooks which are retracted within the body of the lure during normal trolling or retrieving action and then extended for engagement with the fish due to some action upon the lure by the fish. Examples of some such attempts are disclosed in U.S. Pat. Nos. 2,589,343, 1,467,750, 2,485,946, and 2,702,961. However, in all such devices, the hooks either are retained within the body of the lure by a spring, so that the fish itself must both initially and continuously exert sufficient force to overcome the force of a spring; in the latter case, storage and handling of the lure by the fishermen is extremely hazardous even when the spring is so light as to be inadequate to perform the fish-engaging function of the hooks under normal fishing conditions.

Some artificial bait fish lures of the prior art have comprised the production of an entire artificial bait body from a convenient material, with the exterior attachment of hooks and other appendages thereto. When the artificial bait body has been produced from thermoplastic synthetic polymer composition material, attachment of hooks thereto has been accomplished by the employment of hot needles to produce body holes, followed by insertion of the attachment means with the hooks remaining external. Other bodies have been formed with split halves which require assembly and securement after assemblage of some fish-attracting or fish-engaging operative portion therewithin. The prior art bodies have not been unitarily molded with an internal cavity into which operating structure is later installed.

SUMMARY OF THE INVENTION

In order to aid in the understanding of this invention, it can be stated in essentially summary form that it is directed to a fish lure. The fish lure has a body having a recess therein. A barbed hook is pivotally mounted so that it can rotate from a position where it is totally housed in the recess to a position where at least the barbed end extends from the recess. The hook is provided with operating means to which the leader is connected so that leader tension causes the operating means to urge the hook to extend from the recess. Trigger means is mounted upon the body and retains the hook within the recess until actuated so that, as the lure is pulled through the water by the leader, actuation of the trigger means permits the operating means to extend the hook.

Accordingly, it is a principal object of the present invention to provide a fish lure with a retractable and extendable hook which is normally passive and means for actively driving such hook into an extended fish-engaging position only when the two conditions of both trigger actuation and lure trolling are concurrent. It is another object of this invention to provide a fish lure which has at least one hook which is pivotally mounted in and normally recessed in the body of the fish lure and is triggered so that, when a fish engages upon the exterior of the body of the fish lure, the hook is released. It is still another object of this invention to provide a fish lure which has a pivoted hook which can be selectively positioned in recessed or extended positions, with the fish lure being passive in that there are no springs which drive the hook into the extended position and, thus, the fish lure is safe when it is manually handled. It is another object of this invention to provide a fish lure which is adapted to be drawn through the water by a fishing line and leader, with the leader being connected to an operating means within the fish lure, the operating means thus being urged in the direction wherein the hook will be extended, a trigger being employed for actuation by the fish to release the operating means for driving extension of the hook.

It is a further object to provide a fish lure body made of halves of injection-moldable synthetic polymer composition material having high impact strength and formed so that a recess or cavity is formed therebetween for the reception of the hook therein. It is still another object to provide a fish lure with a pivoted fish hook which is swingable from a position in a recess in the body formed of the two halves to an extended position, where the hook is pivoted upon a pin which extends into both body halves. It is still another object to provide a trigger in the form of a fin having a pivot pin extending into both halves of the fish lure body. It is a further object to provide a resilient elastomeric member secured to the fish body and related to the trigger to urge the trigger into latching position with respect to the hook.

The features of the present invention which are believed to be novel are set forth with particularity in the appended claims. The present invention, both as to its organization and manner of operation, together with further objects and advantages thereof, may be understood best by reference to the following description, taken in connection with the accompanying drawings.

BRIEF DESCRIPTION OF THE DRAWINGS

FIG. 1 is a side elevational view of the fish lure of this invention, in the orientation in which it is usually found in use.

FIG. 2 is an enlarged top plan view of the fish lure shown in FIG. 1.

FIG. 3 is a further enlarged and sectional view taken generally along line 3—3 of FIG. 2, showing some of the parts of the fish lure broken away and some in side elevation, with the hook in the retracted position.

FIG. 4 is a partial view, similar to FIG. 3, with the hook in the extended position.

FIG. 5 is a section taken generally along the line 5—5 of FIG. 3.

DESCRIPTION OF THE PREFERRED EMBODIMENT

The fish lure of this invention is generally indicated at 10. Fish lure 10 comprises a body 12 formed of body halves 14 and 16 and a tail 18. Tail 18 is formed of substantially flat elastomeric material inserted into a slot 20 formed at the juncture of the body halves. Tail 18 may be of stamped rubber sheet, of appropriate color, compatible with the body of the fish lure. It can be attached to slot 20 by any convenient adhesive. SUch is the preferred construction, although the tail can be injection-molded to more complex contours and made from a thermoplastic elastomeric synthetic polymer composition material.

As is seen in FIG. 5, the body halves join together along a parting line 22. For convenience of design, this parting line is preferably upon a central plane of the body of the fish lure. A recess 24 is formed in body 12 and, as illustrated, the recess is formed partially on each side of the parting line. Since the recess 24 is preferably centrally located of the body, an alternative method of construction is to employ a parting plane off of center and to position the recess entirely within the thicker body half. However, these are mold design considerations within the scope of the present invention.

Recess 24 is open to the exterior of the body at three locations. At the front, it intersects with face 26 to provide an opening 28 for the entry of leader 30 into the interior of the recess. Additionally, recess 24 meets the lower surface of the body 12 to form hook opening 32. Finally, the recess joins the top surface of the fish lure body to form trigger opening 34.

Positioned within the recess is hook 36 which has a barbed hook end 38. The forward end of hook 36 carries pivot pin 40 which is mounted in the body halves, as shown in FIG. 5. The hook and the recess are of such configuration that the hook can swing from a position where it is fully within the recess, as shown in FIG. 3, to a position where the barbed hook end 38 extends from the recess to a fish-catching position.

Lever 42 is integrally formed with the hook 36 and extends forward of pivot 40. The outer end of lever 42 has securement means thereon, such as a hole therethrough, for the attachment of leader 30. The structure is arranged so that, when the leader 30 is tensioned, the hook 36 is urged from the recess to the extended position. Thus, in the preferred embodiment illustrated, lever 42 is the hook operating means.

Trigger 44 is formed as a substantially flat blade which extends upward out of opening 34 in the body to appear as a fin-like portion 46. Trigger 44 is preferably injection-molded of synthetic polymer composition material and, thus, it can have suitable texture to resemble the fin-type of structure. Further, it is preferably molded with an integral pivot pin 48 which is rotatably engaged in suitable bearing holes in the body halves. The forward end of trigger 44 carries sear 50. Sear 50 engages with stop 52 on hook 36 when the hook is in the retracted position, as shown in FIG. 3.

Trigger 44 is urged into the position where it locks hook 36 in the retracted position, as shown in FIG. 3, by trigger resilient means 54. Trigger resilient means 54 is in the form of a leaf spring, formed of elastomeric material which is elastically deformed as the trigger moves from its latching position to its released position of FIG. 4. In the illustrated preferred embodiment, trigger resilient means 54 is in the form of a rubber or rubber-like extrusion having a bulbous edge. The extrusion is cut to an appropriate length, corresponding to the crosswise dimension of recess 24, and its bulbous edge is placed as a forward end in an appropriate opening molded into the two body halves. Thus, the resilient means 54 is retained in place to urge the trigger in the clockwise direction, as seen in FIGS. 3 and 4.

Leader 30 is necessarily affixed to hook 36 before final assembly of the fish lure. Thus, it must last the life of the fish lure. A stainless steel cable covered with nylon makes a leader of appropriate strength and flexibility for this purpose. Such a leader is attached to the end of operating means lever 42. The hook and the trigger are placed in a cavity half with their pivot pin in the appropriate pivot pin openings. The resilient means 54 is put in place and the second body half is placed thereover. The body halves are secured together by any convenient means, preferably by permanent adhesive compatible with the material of the body halves. Finally, tail 18 is secured in place, also by adhesive or other appropriate means.

In use, leader 30 is attached to the remainder of the fishing tackle, for example, the line on a reel on a fishing rod. Hook 36 is pushed into the recessed position of FIG. 3, if it is not already within body 12, and it is held in this position by means of sear 50 engaging with stop 52. The sear is resiliently maintained in position by means of trigger resilient means 54. Fish lure 10 is preferably of the appearance of a tadpole, when it is especially intended to be a bass plug, as illustrated. However, it can be in other shapes and configurations. As a bass plug, it is trolled through weeds. Since the hook is recessed, weeds do not engage around the body of the lure. Face 26 is shaped in such a way as to cause the fish lure to run at an appropriate depth. Its slope provides a downward force on the fish lure as it is trolled, in opposition to the upward component of force upon leader 30. Since there are no substantial protuberances, weeds do not engage on or restrain the progress of the fish lure.

When a fish engages its mouth around the fish lure, it necessarily engages upon fin portion 46, which is the portion of the trigger which extends out of the body. Upon such trigger activation, sear 50 is moved away from stop 52. The tension upon leader 30, due to the trolling of the fishing lure, causes the operating means lever 42 to produce a torque on the hook around its pivot 40 to swing barbed hook end 38 out of the recess toward the fully-extended position of FIG. 4. The barbed hook end engages within the mouth of the fish and the fish is caught. In fighting the fish and bringing it in, leader tension aids in maintaining the barbed hook end in the mouth of the fish. After the fish is brought in, there is no outward force upon the hook as soon as line tension is released.

While a particular embodiment of the present invention has been shown and described, it will be obvious to those skilled in the art that changes and modifications may be made without departing from this invention in its broader aspects and, therefore, the aim of the appended claims is to cover all such changes and modifications as fall within the true spirit and scope of this invention.

What is claimed is:

1. A fish lure comprising:
   a body having a recess therein;
   fish hook means having a barbed hook end and movably mounted with respect to said body for movement from a position wherein said fish hook means is within said recess to a position wherein said barbed hook end is positioned exteriorly of said recess;
   operating means connected to said hook means and a leader connected to said operating means so that, upon leader tension said barbed hook end is urged in a direction to cause it to extend out of said recess; and
   trigger means pivotably mounted on said body only for restraining said fish hook means to maintain said barbed hook end in a position in said recess, a sear on said trigger means and a stop on the outer periphery of said hook means so that, when said sear is engaged against said stop, said barbed hook end is restrained within said recess and so that, when pivotal rotation of said trigger means rotates said sear away from said stop, said hook means is disengaged from said trigger means and said sear so that said barbed hook end is urged out of recess only by leader tension on said operating means.

2. The fish lure of claim 1 including resilient means engaging said trigger means to resiliently retain said sear in position against said stop.

3. The fish lure of claim 2 wherein said resilient means is mounted on said body and engages against said trigger means.

4. A fish lure comprising:
   a body having a recess therein;
   fish hook means having a barbed hook end and movably mounted with respect to said body for movement from a position wherein said fish hook means is within said recess to a position wherein said barbed hook end is positioned exteriorly of said recess;
   operating means connected to said hook means and a leader connected to said operating means so that, upon leader tension, said barbed hook end is urged out of said recess;
   trigger means pivotably mounted on said body by being mounted upon a pin mounted on said body, said trigger means comprising a fin portion extending from said recess, a sear on said trigger means and a stop on said hook means, resilient means engaging said trigger means to resiliently retain said sear in position against said stop, said resilient means being mounted on said body and engaging against said trigger means so that, when said sear is engaged against said stop, said barbed hook end is restrained within said recess.

5. A fish lure comprising:
   a body having a recess therein;

fish hook means having a barbed hook end and movably mounted with respect to said body for movement from a position wherein said barbed hook end is within said recess to a position wherein said barbed hook end is positioned exteriorly of said of said recess;

operating means connected to said hook means and a leader connected to said operating means so that, upon leader tension, said barbed hook end is urged out of said recess; and trigger means pivotably mounted on said body, said trigger means comprising a fin portion extending from said recess, a sear on said trigger means and a stop on said hook means so that, when said sear is engaged against said stop, said barbed hook end is restrained within said recess.

6. The fish lure of claim 5 wherein said operating means comprises a lever integrally formed with said hook means, said hook being curved and being pivoted within said body so that, when said hook means is in its extended position, said barbed hook end extends forward with respect to said body.

7. The fish lure of claim 6 wherein said lure has a front face and said recess is open to said front face to provide a leader opening, said leader extending through said opening in said front face and being connected to said lever.

8. The fish lure of claim 7 wherein resilient means engages said trigger means to resiliently urge said sear toward said stop.

9. The fish lure of claim 8 wherein said resilient means is mounted on said body and engages against said trigger means.

10. The fish lure of claim 9 wherein said trigger means is unitarily formed with a pivot pin, said pivot pin being rotatably mounted in said body.

11. The fish lure of claim 6 wherein said trigger means is unitarily formed with a pivot pin, said pivot pin being rotatably mounted in said body.

12. The fish lure of claim 4 wherein said trigger means is unitarily formed with a pivot pin and said pivot pin is rotatably mounted in said body.

13. The fish lure of claim 5 wherein said trigger means is unitarily formed with a pivot pin and said pivot pin is rotatably mounted in said body.

* * * * *